United States Patent
Matsuo

(10) Patent No.: US 10,721,374 B2
(45) Date of Patent: Jul. 21, 2020

(54) PRINTING SUPPORT SYSTEM FOR GENERATING DISTRIBUTION TARGET DATA INDICATING DISTRIBUTION TARGETS AND METHOD FOR CONTROLLING THE PRINTING SUPPORT SYSTEM

(71) Applicant: KYOCERA Document Solutions Inc., Osaka (JP)

(72) Inventor: Masaru Matsuo, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/420,917

(22) Filed: May 23, 2019

(65) Prior Publication Data
US 2019/0373139 A1  Dec. 5, 2019

(30) Foreign Application Priority Data
May 30, 2018 (JP) .................................. 2018-103982

(51) Int. Cl.
*H04N 1/60* (2006.01)
*H04N 1/64* (2006.01)
*G06F 3/12* (2006.01)

(52) U.S. Cl.
CPC ........... *H04N 1/642* (2013.01); *G06F 3/1208* (2013.01); *G06F 3/1242* (2013.01)

(58) Field of Classification Search
None
See application file for complete search history.

(56) References Cited

U.S. PATENT DOCUMENTS

| | | | | |
|---|---|---|---|---|
| 7,889,372 B2* | 2/2011 | Iwasaki | ................... | G03G 21/02 |
| | | | | 358/1.13 |
| 8,401,303 B2* | 3/2013 | Dai | .......................... | G06K 9/32 |
| | | | | 382/165 |
| 2003/0051214 A1* | 3/2003 | Graham | .................. | G06F 16/40 |
| | | | | 715/230 |
| 2007/0002370 A1* | 1/2007 | Shibata | .................. | G03G 21/02 |
| | | | | 358/1.15 |
| 2010/0079805 A1* | 4/2010 | Hashimoto | ........... | G06F 21/608 |
| | | | | 358/1.15 |

(Continued)

FOREIGN PATENT DOCUMENTS

JP            5840640 B2        11/2015

*Primary Examiner* — Dung D Tran
(74) *Attorney, Agent, or Firm* — Stein IP, LLC

(57) ABSTRACT

A printing support system includes an information processing apparatus and an image forming apparatus. The information processing apparatus generates distribution target data indicating distribution targets. Based on the distribution target data, the image forming apparatus recognizes departments to which the distribution targets belong, respectively. The image forming apparatus recognizes a minimum color number department whose permissible number of colors used is smallest. The image forming apparatus determines a highlight part in document data. The image forming apparatus generates automatic highlight image data that is image data including the highlight part subjected to a highlighting process and using a number of colors equal to the permissible number of colors of the minimum color number department.

13 Claims, 6 Drawing Sheets

(56) References Cited

U.S. PATENT DOCUMENTS

| | | | | |
|---|---|---|---|---|
| 2010/0245864 A1* | 9/2010 | Nara | ................... | G06F 3/1208 |
| | | | | 358/1.9 |
| 2014/0293344 A1* | 10/2014 | Umezawa | .......... | G03G 15/5016 |
| | | | | 358/1.15 |
| 2015/0271363 A1* | 9/2015 | Okada | ................... | G06Q 30/04 |
| | | | | 358/1.9 |
| 2016/0041949 A1* | 2/2016 | Gluck | ................... | G06F 40/14 |
| | | | | 715/256 |
| 2017/0155803 A1* | 6/2017 | Nishino | .............. | G03G 15/502 |

* cited by examiner

FIG.4

| USER INFORMATION | | 4 |
|---|---|---|
| USER A | USER NAME: AAAA | |
| | BELONGING DEPARTMENT: BBBB | |
| | EMAIL ADDRESS: CCCC | |
| | ⋮ | |
| USER D | USER NAME: DDDD | |
| | BELONGING DEPARTMENT: EEEE | |
| | EMAIL ADDRESS: FFFF | |
| | ⋮ | |
| ⋮ | | |

FIG.5

| DEPARTMENT INFORMATION | | 5 |
|---|---|---|
| DEPARTMENT: GGGG | DEPARTMENT NAME: GGGG | |
| | DEPARTMENT CODE: HHHH | |
| | PRINT SETTING 1: COLOR PRINTING PERMITTED/MONOCHROME PRINTING PERMITTED | |
| | PRINT SETTING 2: NUMBER OF SHEETS PRINTED: UNLIMITED | |
| | ⋮ | |
| DEPARTMENT: JJJJ | DEPARTMENT NAME: JJJJ | |
| | DEPARTMENT CODE: KKKK | |
| | PRINT SETTING 1: COLOR PRINTING NOT PERMITTED/ONLY MONOCHROME PRINTING PERMITTED | |
| | PRINT SETTING 2: NUMBER OF SHEETS PRINTED:100 SHEETS/DAY | |
| | ⋮ | |
| ⋮ | | |

PRINTING SUPPORT SYSTEM FOR GENERATING DISTRIBUTION TARGET DATA INDICATING DISTRIBUTION TARGETS AND METHOD FOR CONTROLLING THE PRINTING SUPPORT SYSTEM

This application is based upon and claims the benefit of priority from the corresponding Japanese Patent Application No. 2018-103982 filed on May 30, 2018, the entire contents of which are incorporated herein by reference.

BACKGROUND

The present disclosure relates to a printing support system including an image forming apparatus.

There are different types of image forming apparatuses such as a printer, a multi-functional peripheral, a copy machine, a facsimile, and so on. Such an image forming apparatus may be used to print conference documents (papers). The following technique for printing conference documents is known.

Specifically, there is known an image forming apparatus that outputs print data based on a print setting and stores, as a user print setting, a print setting with respect to each user. The image forming apparatus further acquires page setting information indicating whether or not to permit the user print setting for each of pages of the print data and determines, based on the page setting information, whether or not the user print setting is permitted for each of the pages. The image forming apparatus further applies the user print setting to any of the pages for which the user print setting is permitted, while applying the print setting of the print data to the other pages and outputs, based on the user print setting or the print setting of the print data thus applied, the print data with respect to the each user. In the image forming apparatus, in instructing whether or not to permit each type of print setting to be applied, it is possible to designate, as a page setting for the each of pages, whether or not to permit a print setting of double-sided output, a monochromatizing process, 2-in-1, or 4-in-1. For each of the other pages for which the user print setting is not permitted according to the page setting information, regarding the print setting of double-sided output, a monochromatizing process, 2-in-1, or 4-in-1, while priority is placed, according to the page setting information, on a setting for instructing whether or not to permit the each type of print setting to be applied, the print setting is changed to such an extent that a use setting is applicable thereto.

An image forming apparatus installed in an office is typically used in a shared manner. The image forming apparatus, therefore, may be used by a plurality of departments (sections). In this case, respective print settings for the departments may be registered in the image forming apparatus. For example, a certain department may set both of color printing and monochrome printing to be permitted. Another department, on the other hand, may set, of color printing and monochrome printing, only monochrome printing to be permitted. From the viewpoints of managing the number of sheets printed and reducing a printing cost, such a difference may be provided between departments. In other words, a permitted item in printing may be different depending on a department.

Meanwhile, a computer (a PC) may be used to prepare papers. For example, word processor software or presentation software is used to prepare papers. Data (document data) of the papers thus created is inputted to the image forming apparatus. Based on the data thus inputted, the image forming apparatus performs printing.

In some cases, papers for a conference to be attended by members of a plurality of departments are printed. Such conference papers may be printed in monochrome (black and white). For example, in consideration of a department(s) permitting only monochrome printing, conference papers may be printed in monochrome. Here, a creator of document data (a file) of the conference papers may perform editing for highlighting a particular part. For example, a part desired to be highlighted is made different in color from other parts. A part to be highlighted (a highlight part) is set to be in red or blue. A part not to be highlighted is set to be in black. When papers including such a highlight part are printed in monochrome, the highlight part is no longer identifiable, which has been problematic.

According to the foregoing known technique, print settings can be made in detail. For example, it is possible to set whether or not to permit a print setting of a monochromatizing process. In a case, however, where a department to which a printing person belongs permits only monochrome printing, papers may be printed in monochrome. As a result, a highlight part in the papers may no longer be identifiable. Consequently, the above-described problem remains unsolved.

SUMMARY

A printing support system according to the present disclosure includes an information processing apparatus and an image forming apparatus. The information processing apparatus stores document data that is data of a document to be distributed. The information processing apparatus generates distribution target data indicating distribution targets to whom a printed matter based on the document data is to be distributed. The image forming apparatus stores a print setting for each of belonging departments. The image forming apparatus receives a piece of the document data and a piece of the distribution target data corresponding to the piece of the document data, which are transmitted from the information processing apparatus. Based on the piece of the distribution target data thus received, the image forming apparatus recognizes, among the belonging departments, departments to which the distribution targets belong, respectively. The image forming apparatus recognizes, among the departments to which the distribution targets belong, respectively, a minimum color number department whose permissible number of colors used in printing is smallest. When a permissible number of colors used in the piece of the document data is larger than the permissible number of colors used in printing of the minimum color number department, the image forming apparatus determines a highlight part in the piece of the document data, which has been edited for highlighting. The image forming apparatus generates automatic highlight image data that is image data including the highlight part subjected to a highlighting process and using a number of colors equal to the permissible number of colors used in printing of the minimum color number department. Based on the automatic highlight image data, the image forming apparatus performs printing.

Further features and advantages of the present disclosure will become more apparent from the description of an embodiment given below.

BRIEF DESCRIPTION OF THE DRAWINGS

FIG. 4 is a view showing one example of user information according to the embodiment.

FIG. 5 is a view showing one example of department information according to the embodiment.

DETAILED DESCRIPTION

The present disclosure takes into consideration a print setting for each department. The present disclosure is to perform printing so that a highlight part (a part of interest) is identifiable even when the printing is performed in monochrome. With reference to FIG. 1 to FIG. 9, the following describes one example of a printing support system 100 according to an embodiment of the present disclosure. Various constituent elements such as configurations, arrangements, and so on described in this embodiment below are not intended to limit the scope of the disclosure and are examples for illustrative purposes only.

(Printing Support System 100)

Figure 1:
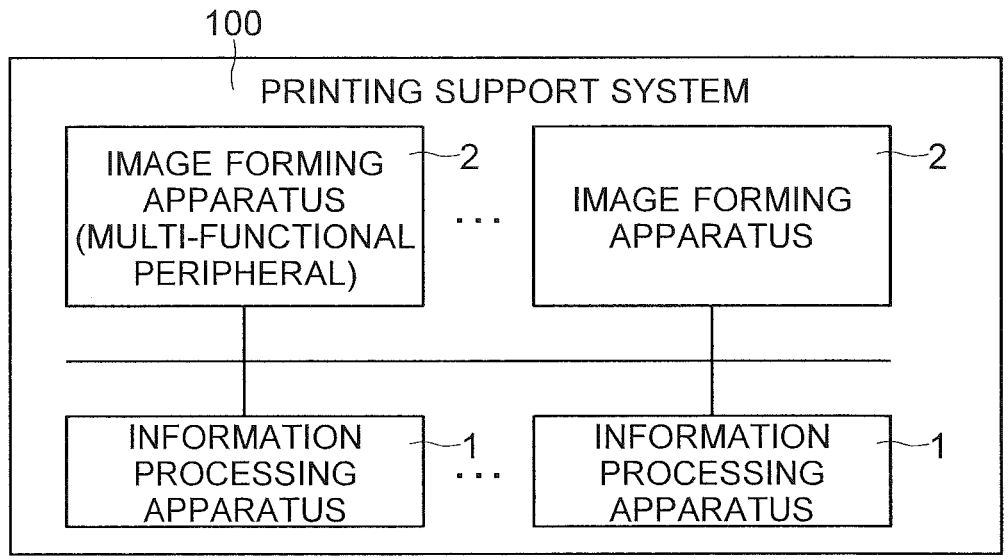
FIG. 1 is a view showing one example of a printing support system according to an embodiment.

With reference to FIG. 1, a description is given of one example of the printing support system 100 according to the embodiment. As shown in FIG. 1, the printing support system 100 includes at least one information processing apparatus 1 and at least one image forming apparatus 2. The printing support system 100 may include a plurality of information processing apparatuses 1 and a plurality of image forming apparatuses 2. The information processing apparatus 1 and the image forming apparatus 2 are communicable with each other. For example, the information processing apparatus 1 is connected to the image forming apparatus 2 via a network.

The information processing apparatus 1 is, for example, a computer. A PC can be used as the information processing apparatus 1. The information processing apparatus 1 may be a portable communication apparatus. The portable communication apparatus refers to, for example, a smartphone or a tablet terminal. The image forming apparatus 2 is, for example, a multi-functional peripheral. The image forming apparatus 2 is not limited to a multi-functional peripheral. The image forming apparatus 2 may be a printer.

(Information Processing Apparatus 1)

Figure 2:
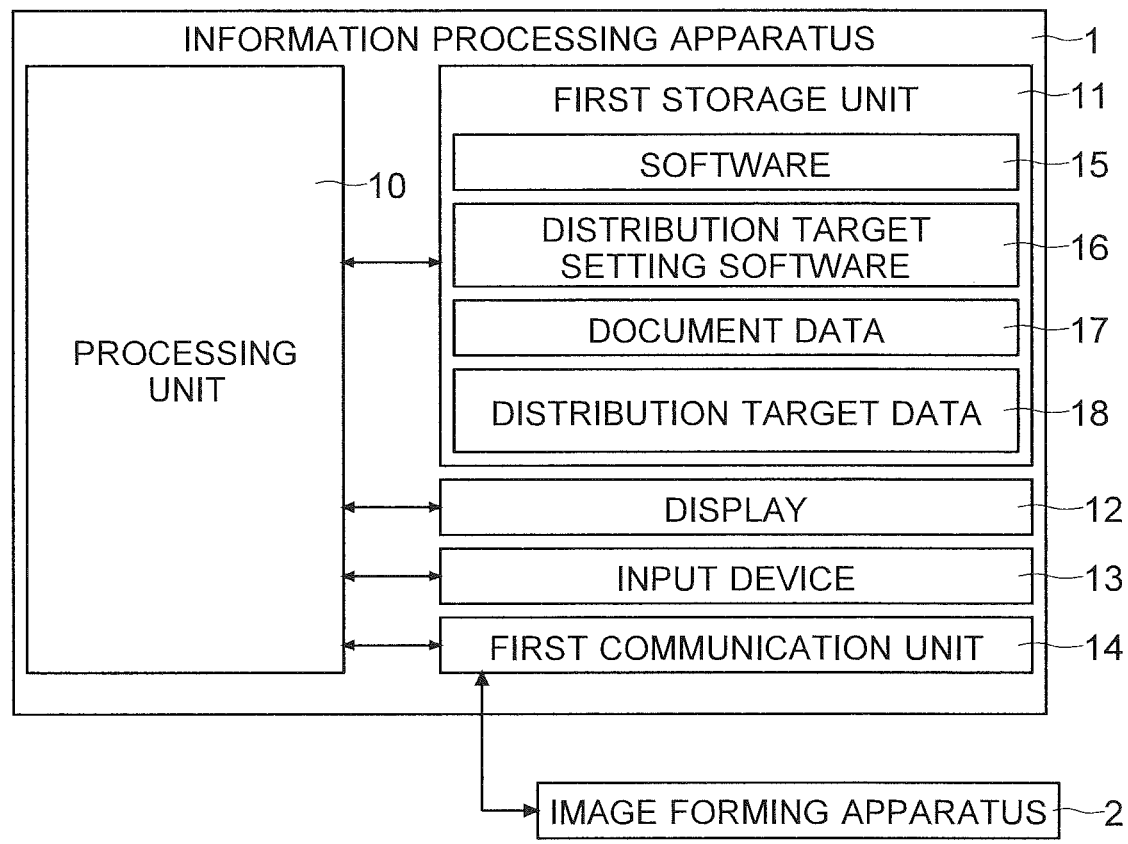
FIG. 2 is a view showing one example of an image processing apparatus according to the embodiment.

Next, with reference to FIG. 2, a description is given of one example of the information processing apparatus 1 according to the embodiment. The information processing apparatus 1 includes a processing unit 10, a first storage unit 11, a display 12, an input device 13, and a first communication unit 14.

The processing unit 10 includes circuits and elements. The processing unit 10 includes, for example, a CPU and an image processing circuit. The first storage unit 11 stores an OS, data, programs, and software 15 in a non-volatile manner. The first storage unit 11 includes, for example, a flash ROM, an HDD, and a RAM. Based on the OS, data, programs, and software 15, the processing unit 10 controls an operation of the information processing apparatus 1. In accordance with contents stored in the first storage unit 11, the processing unit 10 controls various portions of the information processing apparatus 1.

The processing unit 10 controls the display 12 to display various types of information. For example, a liquid crystal display panel or an organic EL display panel is used as the display 12. The input device 13 accepts an operation by a user. The input device 13 is, for example, a keyboard or a mouse. The input device 13 may be a touch panel. Based on an output of the input device 13, the processing unit 10 recognizes contents of the operation performed. The first communication unit 14 includes a communication circuit and a communication memory. The communication memory stores communication software. In response to an instruction from the processing unit 10, the first communication unit 14 communicates with the image forming apparatus 2. The first communication unit 14 is communicable with various apparatuses in a wireless or wired manner.

The software 15 is installed into the first storage unit 11. As the software 15, any one or plurality from among word processor software, presentation software, and spreadsheet software are installed. When preparing a document (a material), a user activates the software 15. The user uses the input device 13 to prepare and edit the document. The input device 13 accepts a command inputted by the user. The processing unit 10 performs a process corresponding to the command thus inputted. When a save command is inputted to the input device 13, the processing unit 10 controls the first storage unit 11 to store data of the document (document data 17) in a non-volatile manner. The document data 17 is a file created using the software 15.

Distribution target setting software 16 is installed into the first storage unit 11 of the information processing apparatus 1. Using the distribution target setting software 16, a user of the information processing apparatus 1 can create distribution target data 18. A distribution target refers to a person to whom a document (a material) is to be distributed. For example, the distribution target data 18 includes a name and an address of each distribution target. The address refers to, for example, an email address or an access path to a computer of the each distribution target. The document to be distributed is, for example, a conference material.

For example, based on the distribution target setting software 16, the information processing apparatus 1 (the processing unit 10) recognizes a name contained in an email message. For example, the processing unit 10 recognizes a name and an email address contained in an address field or a CC field. Based on the name thus recognized, the processing unit 10 generates the distribution target data 18. Furthermore, the input device 13 of the information processing apparatus 1 may accept an input related to a distribution target. For example, the keyboard accepts an input of a name or an email address. The processing unit 10 includes, in the distribution target data 18, a distribution target corresponding to the name or email address inputted to the input device 13. The information processing apparatus 1 generates the distribution target data 18.

Furthermore, it is also possible to edit the distribution target data 18 that has already been created. In this case, the input device 13 accepts a change to or a deletion of a name of a distribution target or a change to or a deletion of an email address. In this manner, the information processing apparatus 1 accepts a setting of a distribution target.

(Image Forming Apparatus 2)

Figure 3:
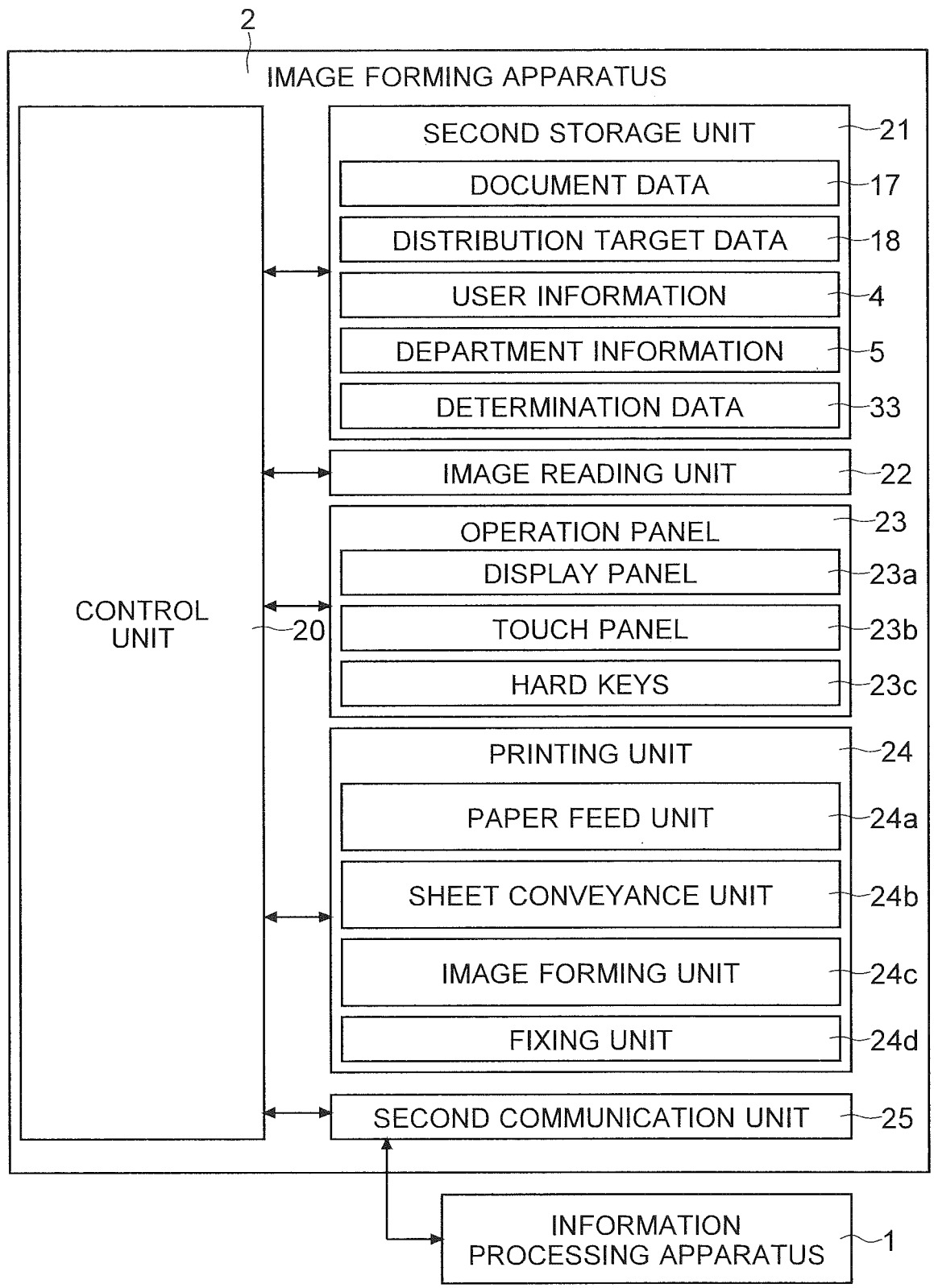
FIG. 3 is a view showing one example of an image forming apparatus according to the embodiment.

With reference to FIG. 3, a description is given of one example of the image forming apparatus 2 according to the embodiment. As shown in FIG. 3, the image forming apparatus 2 includes a control unit 20, a second storage unit 21, an image reading unit 22, an operation panel 23, a printing unit 24, and a second communication unit 25.

The control unit 20 controls an operation of the image forming apparatus 2. The control unit 20 is a substrate including a control circuit (a CPU) and an image processing circuit. The control circuit performs control and computation related to the image forming apparatus 2. Based on programs and data stored in the second storage unit 21, the control circuit controls the various portions of the image forming apparatus 2 and performs various types of computation processing. The second storage unit 21 includes a ROM, a RAM, and a storage (an HDD). The second storage unit 21 stores setting data for controlling the image forming apparatus 2, image data, and control programs.

In a job involving original document reading such as a copying job, the control unit 20 controls the image reading unit 22 to read an original document. The image reading unit 22 generates image data of the original document. In order to perform original document reading and image data generation, the image reading unit 22 includes a light source (a lamp), a lens, an image sensor (a line sensor), and an A/D conversion circuit.

The operation panel 23 includes a display panel 23a, a touch panel 23b, and a hard key 23c. The display panel 23a displays a screen and an image. The control unit 20 controls display on the display panel 23a. The control unit 20 controls the display panel 23a to display an operation image used for a job setting. The operation image is, for example, a button or a key. The touch panel 23b accepts an operation by a user. The touch panel 23b is provided on an upper surface of the display panel 23a. The touch panel 23b recognizes a touched position. Based on an output of the touch panel 23b, the control unit 20 recognizes the operation image operated. Based on the operation image operated, the control unit 20 recognizes contents of the operation by the user. The hard key 23c also accepts an operation by a user.

The printing unit 24 includes a paper feed unit 24a, a sheet conveyance unit 24b, an image forming unit 24c, and a fixing unit 24d. The control unit 20 controls an operation of each of these portions. The control unit 20 controls paper feeding, sheet conveyance, toner image formation, transfer, and fixing. In a printing job, the control unit 20 controls the paper feed unit 24a to feed a sheet one by one. The control unit 20 controls the sheet conveyance unit 24b to convey the sheet thus fed. The control unit 20 controls the image forming unit 24c to form a toner image based on print image data. The control unit 20 controls the image forming unit 24c to transfer the toner image onto the sheet conveyed thereto. The control unit 20 controls the fixing unit 24d to fix the toner image thus transferred onto the sheet. The control unit 20 controls the sheet conveyance unit 24b to discharge the sheet thus subjected to fixing to outside the image forming apparatus 2.

The image forming unit 24c is capable of color printing. The image forming unit 24c includes an image forming unit that forms a black toner image, an image forming unit that forms a yellow toner image, an image forming unit that forms a cyan toner image, and an image forming unit that forms a magenta toner image. In performing color printing, these image forming units form toner images. The image forming unit 24c transfers, onto a sheet, the thus formed toner images of the respective colors in a superimposed manner. In performing monochrome (black and white) printing, the control unit 20 controls only the image forming unit that forms a black toner image to form a toner image.

The second communication unit 25 is communicably connected to the information processing apparatus 1 (a multi-functional peripheral). The second communication unit 25 is provided with communication hardware (various types of sockets, a communication circuit) and a communication memory. The communication memory stores communication software.

(User Information 4 and Belonging Departments)

Next, with reference to FIG. 3 to FIG. 5, a description is given of one example of user information 4 and department information 5 stored by the image forming apparatus 2 according to the embodiment. As shown in FIG. 3, the second storage unit 21 stores the user information 4 in a non-volatile manner. The user information 4 is information related to each accessible user of the image forming apparatus 2. As shown in FIG. 4, the user information 4 includes information such as a name of the each accessible user (a user name), a department to which the each accessible user belongs, or an email address on a computer used by the each accessible user. The operation panel 23 accepts addition (registration) or deletion of an accessible user or editing of information related to an accessible user. Based on an operation of the addition, deletion, or editing performed on the operation panel 23, the control unit 20 updates the user information 4.

Furthermore, as shown in FIG. 3, the second storage unit 21 stores the department information 5 in a non-volatile manner. The department information 5 is registered beforehand. The department information 5 can be registered by operating the operation panel 23. The department information 5 includes information related to each department. As shown in FIG. 5, the department information 5 includes, with respect to each department, a department name, a department code, and set values of a plurality of print setting items. The print setting items include, for example, an item regarding whether or not to permit color printing. It is possible to make a setting so that both of color printing and monochrome printing are permitted. Furthermore, it is also possible to make a setting so that, of color printing and monochrome printing, only monochrome printing is permitted and color printing is not permitted. Thus, the department information 5 includes a permissible number of colors used in printing of each belonging department. The other print setting items include, for example, an item regarding a limit on the number of sheets printed.

(Printing Using Distribution Target Data 18)

Figure 6:
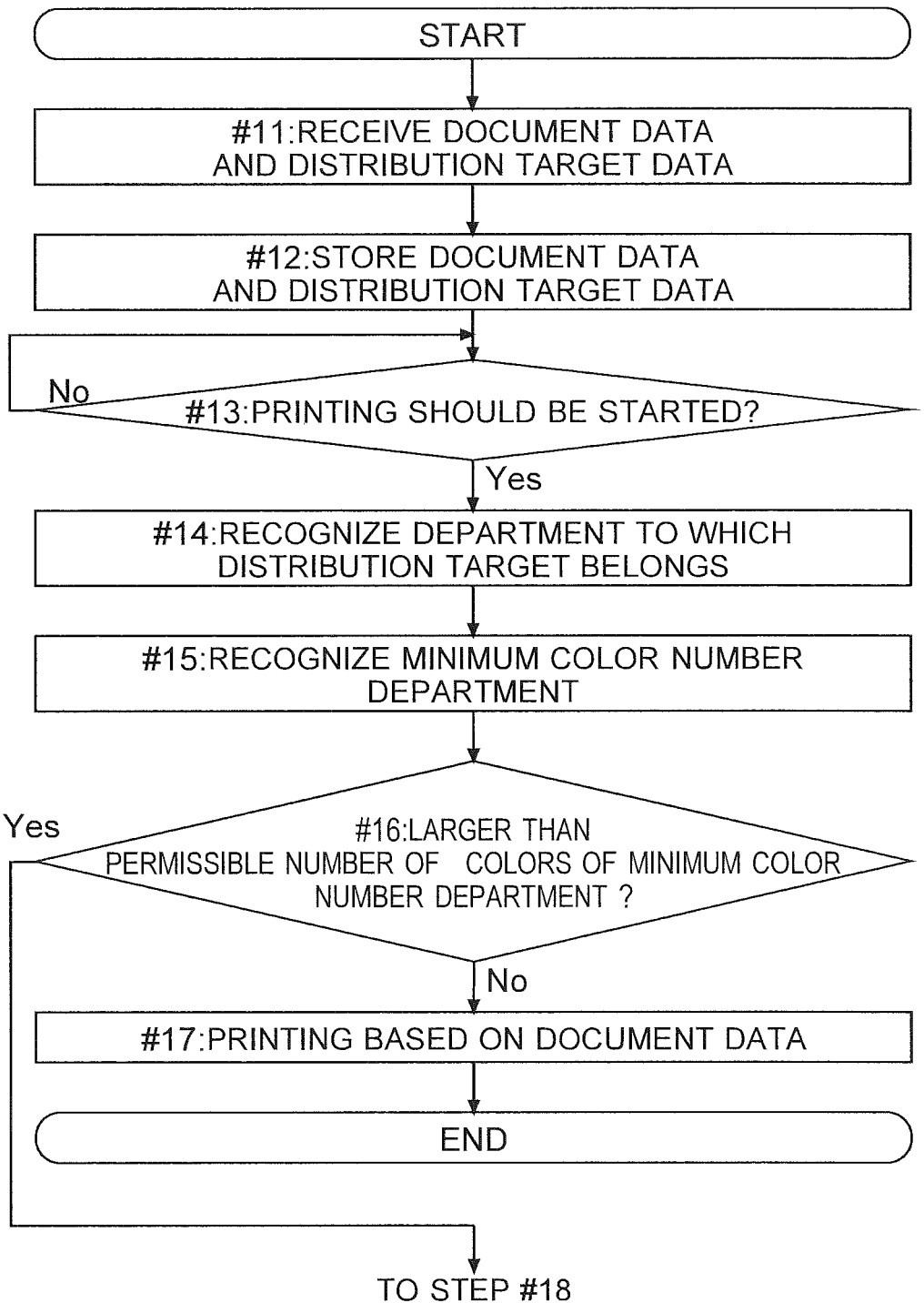
FIG. 6 is a view showing one example of printing using distribution target data performed in the printing support system according to the embodiment.
Figure 7:
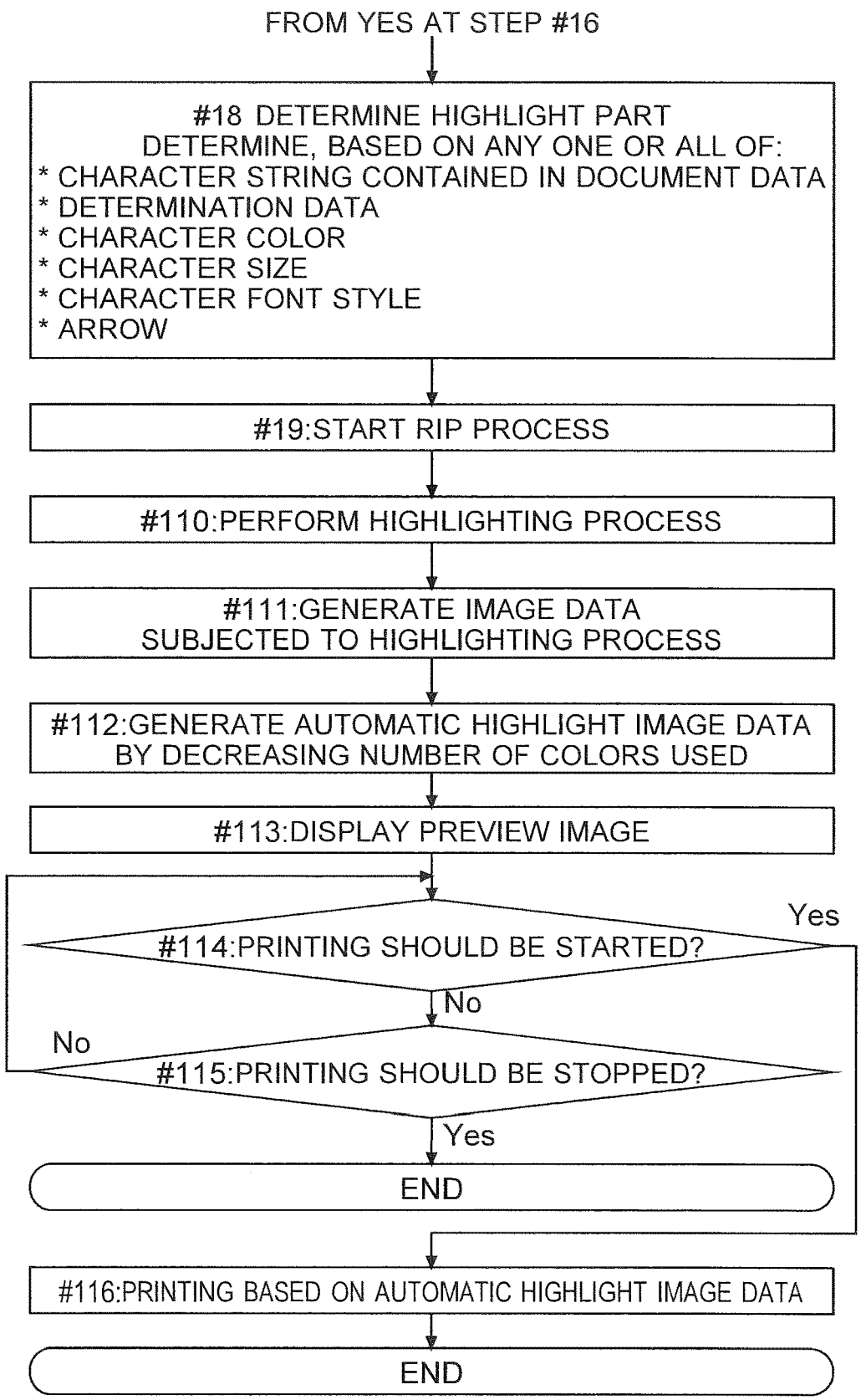
FIG. 7 is a view showing the one example of printing using distribution target data performed in the printing support system according to the embodiment.

Next, with reference to FIG. 6-FIG. 9, a description is given of one example of printing using the distribution target data 18 performed in the printing support system 100 according to the embodiment. In FIG. 6, "START" refers to a point in time when the information processing apparatus 1 (the processing unit 10) transmits, toward the image forming apparatus 2 (the second communication unit 25), a piece of document data 17 and a piece of distribution target data 18 corresponding to the piece of document data 17.

The input device 13 of the information processing apparatus 1 accepts an instruction to transmit a piece of document data 17 to the image forming apparatus 2. For example, the operation panel 23 accepts an instruction to transmit a piece of document data 17 (a file) created using the presentation software, the word processor software, or the spreadsheet software. At this time, the input device 13 also accepts a setting of a piece of distribution target data 18 to be attached to the piece of document data 17 to be transmitted. The processing unit 10 performs control so that the piece of document data 17 and the piece of distribution target data 18 corresponding to the piece of document data 17 are transmitted together toward the second communication unit 25.

The image forming apparatus 2 (the second communication unit 25) receives the piece of document data 17 and the piece of distribution target data 18 corresponding to the piece of document data 17 (Step #11). The image forming apparatus 2 (the control unit 20) controls the second storage unit 21 to store the piece of document data 17 and the piece of distribution target data 18 thus received in a non-volatile manner (Step #12, see FIG. 3).

The image forming apparatus 2 (the control unit 20) confirms whether or not to start printing using the piece of distribution target data 18 (Step #13, No at Step #13→Step #13). At a point in time when the piece of document data 17 and the piece of distribution target data 18 corresponding to the piece of document data 17 are received, the control unit 20 may recognize that the printing should be started. Furthermore, when the operation panel 23 of the image forming apparatus 2 has accepted a start of printing based on the piece of document data 17 and the piece of distribution target data 18 corresponding to the piece of document data 17, the control unit 20 may recognize that the printing should be started.

Upon recognizing that the printing should be started (Yes at Step #13), based on the piece of distribution target data 18, the control unit 20 recognizes departments to which distribution targets belongs, respectively (Step #14). Specifically, based on the piece of distribution target data 18, the control unit 20 recognizes a name of each of the distribution targets. Subsequently, the control unit 20 refers to the user information 4 and thus recognizes a belonging department corresponding to the name thus recognized.

The control unit 20 recognizes a minimum color number department among the departments to which the distribution targets belong, respectively (Step #15). The minimum color number department refers to one of the departments recognized, which permits a smallest number of colors to be used in printing. For example, in a case where a department a permits both of color printing and monochrome printing and a department b permits only monochrome printing, the minimum color number department corresponds to the department b.

The control unit 20 checks whether or not a permissible number of colors used in the piece of document data 17 is larger than a permissible number of colors used in printing of the minimum color number department (Step #16). For example, in a case where the piece of document data 17 is color data (data using chromatic colors) and the minimum color number department permits only monochrome printing, the control unit 20 determines that the permissible number of colors used in the piece of document data 17 is larger than the permissible number of colors of the minimum color number department (Yes at Step #16). In a case where the piece of document data 17 is color data and the minimum color number department permits color printing, the control unit 20 determines that the permissible number of colors used in the piece of document data 17 is not larger than the permissible number of colors of the minimum color number department (No at Step #16).

In a case of No at Step #16, the control unit 20 performs printing based on the piece of document data 17 (Step #17). Specifically, using a RIP process, the control unit 20 generates image data (a raster image) based on the piece of document data 17. In a case where the piece of document data 17 is color data, the control unit 20 performs control so that color image data is generated. For example, the control unit 20 converts the piece of document data 17 into data described in a page description language. Based on the data described in the page description language, the image processing circuit generates image data (bitmap data) of each page of the piece of document data 17. Based on the image data, the image processing circuit generates print image data. The control unit 20 transmits the print image data thus generated to the image forming unit 24c. Based on the print image data received, the image forming unit 24c forms a toner image. Then, this flow is ended (END).

In a case of Yes at Step #16, the image forming apparatus 2 (the control unit 20) determines a highlight part 6 in the piece of document data 17 (Step #18). The highlight part 6 refers to a part recognized as having been edited for highlighting (see FIG. 9). The control unit 20 estimates a part desired to be highlighted by a person preparing a document.

Based on a character string (including a sentence, a text part, a numeral, and a symbol) contained in the piece of document data 17, the control unit 20 may determine the highlight part 6. For example, a piece of document data 17 for presentation may contain a sentence such as "Attention to X." In this case, the control unit 20 may search for a character string "attention to" and determine that a part having the same character string as that of a part "X" (an object part) is the highlight part 6.

The control unit 20 may determine whether or not a word indicating a color is contained in the character string in the object part. The control unit 20 may determine that a character string in the same color as the color indicated by the word contained is the highlight part 6. For example, in a case where the object part contains a character "red," the control unit 20 may determine that any character string in red among characters contained in the piece of document data 17 is the highlight part 6.

Furthermore, based on determination data 33, the control unit 20 may determine the highlight part 6. The determination data 33 is stored in a non-volatile manner in the second storage unit 21 (the image forming apparatus 2) (see FIG. 3). The determination data 33 is data defining a condition for determining the highlight part 6. There are various conditions that can be defined by the determination data 33. For example, when a determination condition is defined to be a character string in red, the control unit 20 determines that a character string in red contained in the piece of document data 17 is the highlight part 6. Furthermore, when a particular word (a key word) such as "important" is defined as a determination condition, the control unit 20 determines that a part in the piece of document data 17 corresponding to the particular word is the highlight part 6. The operation panel 23 may accept a setting of such a determination condition. At this time, the control unit 20 updates the determination data 33. Specifically, the control unit 20 adds a condition set on the operation panel 23 to the determination data 33.

Furthermore, based on a character color, the image forming apparatus 2 (the control unit 20) may determine the highlight part 6. For example, the control unit 20 recognizes character colors of characters contained in the piece of document data 17. Further, the control unit 20 may determine that a character string having a character color less frequently used is the highlight part 6. For example, a part desired to be highlighted may be highlighted by using a different color for a character string thereof. The control unit 20 recognizes a character color used for a predetermined or less number of characters contained in the piece of document data 17. The control unit 20 determines that a character string having the character color thus recognized is the highlight part 6. A creator of the document data 17 can determine that a part having an intentionally changed character color is the highlight part 6.

Furthermore, based on a character size, the image forming apparatus 2 (the control unit 20) may determine the highlight part 6. A part desired to be highlighted may use a different character size. For example, the control unit 20 recognizes a font size of each character contained in the piece of document data 17. Further, the control unit 20 may determine that a character part having a character size other than a character size used for a largest number of characters is the highlight part 6. For example, the control unit 20 may determine that a character part having a character size used for a smallest number of characters contained in the piece of document data 17 is the highlight part 6. A creator of the document data 17 can determine that a part having a different character size is the highlight part 6.

Furthermore, based on a character font type, the image forming apparatus 2 (the control unit 20) may determine the highlight part 6. A font type of some characters may be changed for highlighting. For example, the control unit 20 recognizes a font type of each character contained in the piece of document data 17. Further, the control unit 20 may determine that a character part having a font type other than a font type used for a largest number of characters is the highlight part 6. For example, the control unit 20 may determine that a character part having a font type used for a smallest number of characters contained in the piece of document data 17 is the highlight part 6. A creator of the document data 17 can determine that a part having a different font type is the highlight part 6.

Furthermore, based on an arrow contained in the piece of document data 17, the image forming apparatus 2 (the control unit 20) is the highlight part 6. For example, the control unit 20 recognizes an image of an arrow contained in the piece of document data 17. Further, the control unit 20 may determine that a character string or an image pointed by the arrow is the highlight part 6. A creator of the document data 17 can determine that a part indicated by an arrow is the highlight part 6.

The operation panel 23 (the image forming apparatus 2) may accept a setting for selecting one of a character string contained in the piece of document data 17, the determination data 33, a character color, a character size, a character font type, and an arrow as a basis for determining the highlight part 6. In this case, the control unit 20 controls the second storage unit 21 to store data indicating contents of the selection made on the operation panel 23. By referring to the data indicating the contents of the selection, the control unit 20 determines the highlight part 6.

Then, the control unit 20 starts the RIP process with respect to the piece of document data 17 (Step #19). Subsequently, the control unit 20 performs a highlighting process with respect to the highlight part 6 in the piece of document data 17 (Step #110). The control unit 20 converts a file into data described in the page description language (page description data). For example, a file of a word processor document or a presentation document is converted. The control unit 20 recognizes the highlight part 6 in the page description data obtained by the conversion. The control unit 20 adds a description indicating the highlighting process to the highlight part 6 in the page description data.

The highlighting process is preset. For example, the highlighting process is a process of enclosing the highlight part 6 in a frame. In this case, the control unit 20 adds a description to enclose, in a frame, the highlight part 6 in the page description data. The highlighting process may be a process of adding an underline. Furthermore, the highlighting process may be a process of increasing a font size of the highlight part 6. Furthermore, the highlighting process may be a process of changing a font style of the highlight part 6. The highlighting process may be a process of changing a style of each character in the highlight part 6 to italics.

Furthermore, the image forming apparatus 2 (the control unit 20) may add, to the highlight part 6, a character(s) indicating that the highlight part 6 is important. For example, the control unit 20 may add a description to add a character "Important" on an upper right side of the highlight part 6 in the page description data.

Furthermore, the control unit 20 may automatically select an expression (contents) of the highlighting process. In this case, the image forming apparatus 2 recognizes a highlighting expression used in a page including the highlight part 6 in the piece of document data 17. Further, the control unit 20 performs, with respect to the highlight part 6, a highlighting process using a highlighting expression not used in the page. For example, when an underline is used in a page including the highlight part 6, the control unit 20 performs, with respect to the highlight part 6, a highlighting process using a highlighting expression other than an underline. When a frame is used multiple times in a page including the highlight part 6, the control unit 20 performs, with respect to the highlight part 6, a highlighting process using a highlighting expression other than a frame.

Figure 8:
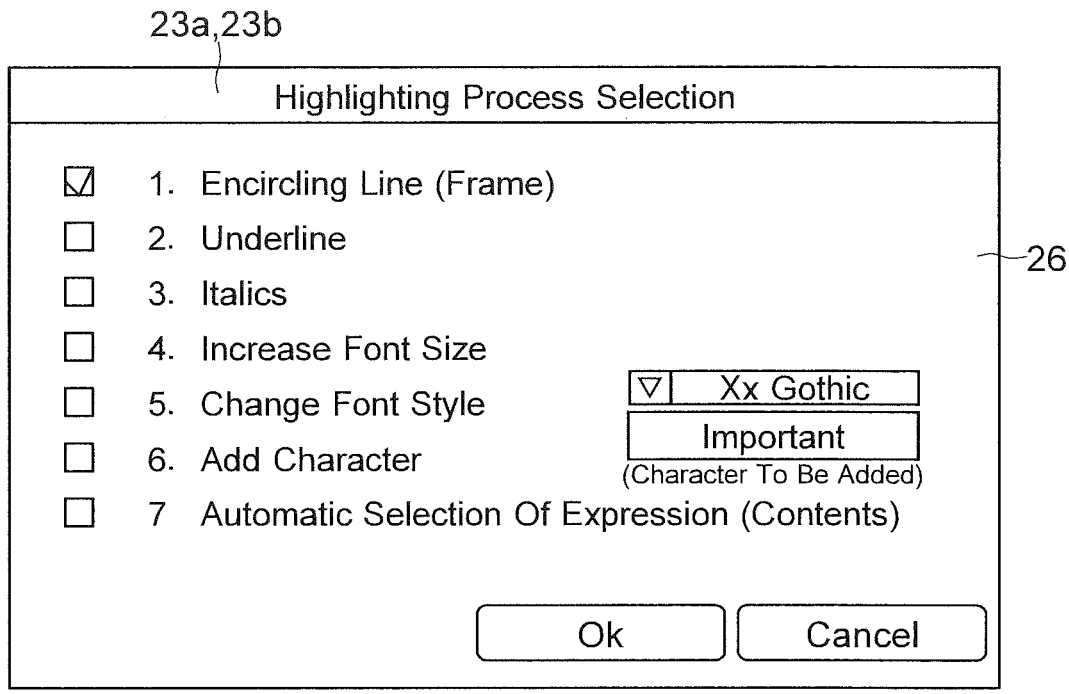
FIG. 8 is a view showing one example of a highlighting process selection screen according to the embodiment.

FIG. 8 is a view showing one example of a highlighting process selection screen 26. The highlighting process selection screen 26 is a screen for selecting a highlighting process to be used. The highlighting process selection screen 26 includes a plurality of check boxes. By checking on/off the check boxes, it is possible to select a process to be used from among a frame (an encircling line), an underline, italics, changing a font size, changing a font style, an addition of a character(s), and an automatic selection of an expression (contents) of the highlighting process. The operation panel 23 accepts a selection of a highlighting process to be used. The control unit 20 performs the highlighting process thus selected.

Subsequently, the control unit 20 generates image data based on the page description data subjected to the highlighting process (Step #111). Based on the page description data to which a description corresponding to the highlighting process is added, the control unit 20 generates raster image data (bitmap data). Thus, there is generated image data including the highlight part 6 subjected to the highlighting process.

Subsequently, the control unit 20 (the image processing circuit) decreases the number of colors used in the image data thus generated so as to generate automatic highlight image data 7 (Step #112). Specifically, the control unit 20 performs a conversion into the permissible number of colors used in printing of the minimum color number department. For example, in a case where the permissible number of colors used in printing of the minimum color number department is one (monochrome), the control unit 20 converts color image data into monochrome image data. The image data resulting from the conversion is used as the automatic highlight image data 7.

Figure 9:
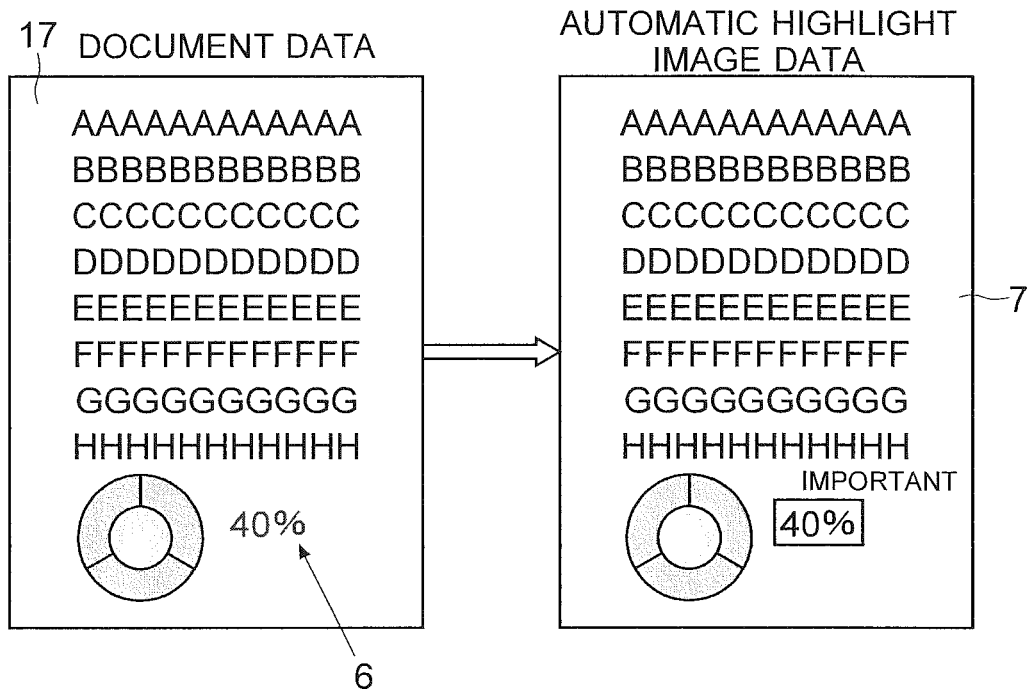
FIG. 9 is a view showing one example of automatic highlight image data according to the embodiment.

A left diagram in FIG. 9 shows a certain page of the piece of document data 17. A right diagram in FIG. 9 shows one example of the automatic highlight image data 7 generated. Assume that a character string "40%" in the piece of document data 17 in the left diagram in FIG. 9 is determined as the highlight part 6 by the control unit 20. In this case, as shown in the right diagram in FIG. 9, the control unit 20 generates a piece of automatic highlight image data 7 to highlight a character part (numerals+a symbol) "40%" with a frame. Even when the piece of document data 17 that is color data is printed in monochrome, a part highlighted in the piece of document data 17 that is color data is identifiable.

Further, the control unit 20 controls the display panel 23a to display a preview image based on the piece of automatic highlight image data 7 (Step #113). For example, the control unit 20 scales down the piece of automatic highlight image data 7 so as to generate preview image data. Based on the preview image data, the control unit 20 controls the display panel 23a to display a preview image.

The control unit 20 confirms whether or not a printing start instruction has been issued (Step #114). The operation panel 23 accepts the printing start instruction. For example, the control unit 20 controls the display panel 23a to display a printing start button together with a preview image. Upon the printing start button being operated, the control unit 20 recognizes that the printing start instruction has been issued. Furthermore, upon a start key (the hard key 23c) on the operation panel 23 being operated, the control unit 20 may recognize that the printing start instruction has been issued.

In a case where the printing start instruction has not been issued (No at Step #114), the control unit 20 confirms whether or not a printing stop instruction has been issued (Step #115). For example, the control unit 20 controls the display panel 23a to display a printing stop button together with a preview image. Upon the printing stop button being operated, the control unit 20 recognizes that the printing stop instruction has been issued. Upon the printing stop instruction being issued (Yes at Step #115), this flow is ended (END). In this case, printing based on the piece of document data 17 is not performed. On the other hand, when the printing stop instruction has not been issued (No at Step #115), the flow returns to Step #114.

Upon the printing start instruction being issued (Yes at Step #114), the control unit 20 controls the printing unit 24 to perform printing based on the piece of automatic highlight image data 7 (Step #116). Thus, even when the piece of document data 17 that is color data is printed in monochrome, it is possible to obtain a printed matter on which the highlight part 6 is identifiable. Then, this flow is ended (END).

As described above, the printing support system 100 according to the embodiment includes the information processing apparatus 1 and the image forming apparatus 2. The information processing apparatus 1 stores the document data 17 that is data of a document to be distributed. The information processing apparatus 1 generates the distribution target data 18 indicating distribution targets to whom a printed matter based on the document data 17 is to be distributed. The image forming apparatus 2 stores a print setting for each of belonging departments. The image forming apparatus 2 receives a piece of document data 17 and a piece of distribution target data 18 corresponding to the piece of document data 17, which are transmitted from the information processing apparatus 1. Based on the piece of distribution target data 18 thus received, the image forming apparatus 2 recognizes, among the belonging departments, departments to which the distribution targets belong, respectively. The image forming apparatus 2 recognizes, among the departments to which the distribution targets belong, respectively, a minimum color number department whose permissible number of colors used in printing is smallest. When a permissible number of colors used in the piece of document data 17 is larger than the permissible number of colors used in printing of the minimum color number department, the image forming apparatus 2 determines the highlight part 6 in the piece of document data 17, which has been edited for highlighting. The image forming apparatus 2 generates the automatic highlight image data 7 that is image data including the highlight part 6 subjected to a highlighting process and using a number of colors equal to the permissible number of colors used in printing of the minimum color number department. Based on the automatic highlight image data 7, the image forming apparatus 2 performs printing.

In performing printing using a reduced number of colors based on the document data 17, a document can be printed so that the highlight part 6 is identifiable. The document data 17 can be printed in monochrome (black and white) so that the highlight part 6 expressed in colors (chromatic colors) is identifiable. Even when conference attendees belong to different departments, respectively, all the attendees can be provided with the same document (a document printed in monochrome). Conference papers can be printed in accordance with a department whose permissible number of colors used is limited.

Furthermore, in monochrome printing, a highlighting process with respect to image data of the highlight part 6 is automatically performed. A person preparing a document is saved from the trouble of editing the document data 17 for color printing so as to create the document data 17 for monochrome printing. For example, the person is saved from the trouble of processing a part in the document data 17, which has been made identifiable by color as important.

Before performing printing based on the automatic highlight image data 7, the image forming apparatus 2 displays a preview image based on the automatic highlight image data 7. Upon accepting the printing start instruction, printing based on the automatic highlight image data 7 is started. One example of a result of printing based on the automatic highlight image data 7 can be presented to a user. The user can confirm whether or not it is appropriate to perform printing based on the automatic highlight image data 7.

The image forming apparatus 2 (the control unit 20) recognizes a character(s) contained in the document data 17. Based on the character(s) thus recognized, the image forming apparatus 2 determines the highlight part 6. Based on the character(s) contained in the document data 17, the highlight part 6 in the document data 17 can be automatically determined. For example, by extracting a phrase indicating a highlight part, the highlight part 6 can be automatically pinpointed.

The image forming apparatus 2 (the second storage unit 21) stores the determination data 33 for determining the highlight part 6. Based on the determination data 33, the image forming apparatus 2 (the control unit 20) determines the highlight part 6. The determination data 33 is data defining a preset condition for determining the highlight part 6. A part described so as to satisfy the condition defined by the determination data 33 can be determined as the highlight part 6. In order that a part may be determined as the highlight part 6, a person preparing a document has only to describe the part so as to satisfy the condition.

The information processing apparatus 1 (the processing unit 10) recognizes a name contained in an email message. Based on the name thus recognized, the information processing apparatus 1 generates the distribution target data 18. Based on an email message including such a piece of distribution target data 18, the distribution target data 18 can be automatically generated.

The information processing apparatus 1 (the input device 13) accepts an input to select a person to be added to the distribution targets. The information processing apparatus 1 (the processing unit 10) includes, in the distribution target data 18, the person thus selected. A setting of a distribution target can be performed in this manner. A desired person can be included in the distribution target data 18.

The image forming apparatus 2 (the control unit 20) recognizes character colors of characters contained in the document data 17. The image forming apparatus 2 determines, as the highlight part 6, a character string having, among the character colors, a character color used for a predetermined or less number of characters in the document data 17. A part using a characteristic color in the document data 17 can be determined as the highlight part 6.

Among characters contained in the document data 17, the image forming apparatus 2 (the control unit 20) determines, as the highlight part 6, a character part having a character size other than a most-used character size and determines, as the highlight part 6, a character part having a font type other than a most-used font type. A part having a characteristic font in the document data 17 can be determined as the highlight part 6.

In a case where an arrow is contained in the document data 17, the image forming apparatus 2 (the control unit 20) determines that a character(s) or an image pointed by the arrow is the highlight part 6. A part indicated by an arrow in the document data 17 can be determined as the highlight part 6.

The image forming apparatus 2 (the control unit 20) generates the automatic highlight image data 7 to add, to the highlight part 6, a character(s) indicating that the highlight part 6 is important. There is printed a document to which the character(s) indicating that the highlight part 6 is intended to be highlighted is added. A person who has received the document (a document receiver) can easily recognize the highlight part 6.

The image forming apparatus 2 (the control unit 20) recognizes a highlighting expression used in a page including the highlight part 6 in the document data 17. The image forming apparatus 2 performs, with respect to the highlight part 6, the highlighting process using a highlighting expression not used in the page. In a case where a similar highlighting expression has been used multiple times, even when a similar highlighting process is performed, the highlight part 6 is buried in other expressions and does not stand out. Highlighting techniques not included in a search range of techniques are adopted, and thus a part subjected to a highlighting process can be made to stand out.

The image forming apparatus 2 (the second storage unit 21) stores the department information 5 containing information on the belonging departments registered beforehand. Furthermore, the image forming apparatus 2 stores the user information 4 containing information on accessible users of the image forming apparatus 2 and defining the departments to which the accessible users belongs, respectively. The department information 5 includes a permissible number of colors used in printing of each of the belonging departments. It is possible to determine whether each of the departments permits both of color printing and monochrome printing or, of color printing and monochrome printing, only monochrome printing.

While the foregoing has described the embodiment of the present disclosure, the scope of the present disclosure is not limited thereto. The present disclosure can be implemented by adding various modifications thereto without departing from the spirit of the disclosure.

What is claimed is:

1. A printing support system, comprising:
an information processing apparatus; and
an image forming apparatus,
wherein
the information processing apparatus stores document data that is data of a document to be distributed,
the information processing apparatus generates distribution target data indicating distribution targets that are persons to whom a printed matter based on the document data is to be distributed,
the image forming apparatus stores a print setting for each of belonging departments,
the image forming apparatus receives a piece of the document data and a piece of the distribution target data corresponding to the piece of the document data, which are transmitted from the information processing apparatus,
based on the piece of the distribution target data thus received, the image forming apparatus recognizes, among the belonging departments, departments to which the distribution targets belong, respectively,
the image forming apparatus recognizes, among the departments to which the distribution targets belong, respectively, a minimum color number department whose permissible number of colors used in printing is smallest,
when a permissible number of colors used in the piece of the document data is larger than the permissible number of colors used in printing of the minimum color number department, the image forming apparatus determines a highlight part in the piece of the document data, which has been edited for highlighting,
the image forming apparatus generates automatic highlight image data that is image data including the highlight part subjected to a highlighting process and using a number of colors equal to the permissible number of colors used in printing of the minimum color number department and in which a character indicating that the highlight part is important is added to the highlight part, and
based on the automatic highlight image data, the image forming apparatus performs printing.

2. The printing support system according to claim 1, wherein
before performing the printing based on the automatic highlight image data, the image forming apparatus displays a preview image based on the automatic highlight image data, and
upon accepting a printing start instruction, the image forming apparatus starts the printing based on the automatic highlight image data.

3. The printing support system according to claim 1, wherein
the image forming apparatus recognizes a character contained in the piece of the document data, and
based on the character thus recognized, the image forming apparatus determines the highlight part.

4. The printing support system according to claim 1, wherein
the image forming apparatus stores determination data for determining the highlight part,
based on the determination data, the image forming apparatus determines the highlight part, and
the determination data is data defining a preset condition for determining the highlight part.

5. The printing support system according to claim 1, wherein
the information processing apparatus recognizes a name contained in an email message, and
based on the name thus recognized, the information processing apparatus generates the distribution target data.

6. The printing support system according to claim 1, wherein
the information processing apparatus accepts an input to select a person to be added to the distribution targets, and
the information processing apparatus includes, in the distribution target data, the person thus selected.

7. The printing support system according to claim 1, wherein
the image forming apparatus recognizes character colors of characters contained in the piece of the document data, and
the image forming apparatus determines, as the highlight part, a character string having, among the character colors, a character color used for a predetermined or less number of characters in the piece of the document data.

8. The printing support system according to claim 1, wherein
among characters contained in the piece of the document data, the image forming apparatus determines, as the highlight part, a character part having a character size other than a most-used character size, and
the image forming apparatus determines, as the highlight part, a character part having a font type other than a most-used font type.

9. The printing support system according to claim 1, wherein
in a case where an arrow is contained in the piece of the document data, the image forming apparatus determines that a character or an image pointed by the arrow is the highlight part.

10. The printing support system according to claim 1, wherein
the image forming apparatus recognizes a highlighting expression used in a page including the highlight part in the piece of the document data, and
the image forming apparatus performs, with respect to the highlight part, the highlighting process using a highlighting expression not used in the page.

11. The printing support system according to claim 1, wherein
the image forming apparatus accepts a selection of the highlighting process to be used, and
the image forming apparatus performs the highlighting process thus selected.

12. The printing support system according to claim 1, wherein
the image forming apparatus stores department information containing information on the belonging departments registered beforehand,
the image forming apparatus stores user information containing information on accessible users of the image forming apparatus and defining the departments to which the accessible users belongs, respectively, and
the department information includes a permissible number of colors used in printing of each of the belonging departments.

13. A method for controlling a printing support system including an information processing apparatus and an image forming apparatus, the method comprising steps of:
storing, in the information processing apparatus, document data that is data of a document to be distributed,
generating, by the information processing apparatus, distribution target data indicating distribution targets that are persons to whom a printed matter based on the document data is to be distributed,
storing, in the image forming apparatus, a print setting for each of belonging departments,
receiving, by the image forming apparatus, a piece of the document data and a piece of the distribution target data corresponding to the piece of the document data, which are transmitted from the information processing apparatus,
recognizing, by the image forming apparatus, based on the piece of the distribution target data thus received, among the belonging departments, departments to which the distribution targets belong, respectively,
recognizing, by the image forming apparatus, among the departments to which the distribution targets belong, respectively, a minimum color number department whose permissible number of colors used in printing is smallest,
determining, by the image forming apparatus, when a permissible number of colors used in the piece of the document data is larger than the permissible number of colors used in printing of the minimum color number department, a highlight part in the piece of the document data, which has been edited for highlighting,
generating, by the image forming apparatus, automatic highlight image data that is image data including the highlight part subjected to a highlighting process and using a number of colors equal to the permissible number of colors used in printing of the minimum color number department and in which a character indicating that the highlight part is important is added to the highlight part, and
performing, based on the automatic highlight image data, printing by the image forming apparatus.

* * * * *